United States Patent
Ohta

(10) Patent No.: US 8,574,077 B2
(45) Date of Patent: *Nov. 5, 2013

(54) STORAGE MEDIUM HAVING GAME PROGRAM STORED THEREON, GAME APPARATUS, INPUT DEVICE, AND STORAGE MEDIUM HAVING PROGRAM STORED THEREON

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 887 days.

This patent is subject to a terminal disclaimer.

(21) Appl. No.: 11/182,737

(22) Filed: Jul. 18, 2005

(65) Prior Publication Data

US 2006/0019753 A1    Jan. 26, 2006

(30) Foreign Application Priority Data

Jul. 26, 2004  (JP) .................................. 2004-217441

(51) Int. Cl.
*A63F 9/00*       (2006.01)

(52) U.S. Cl.
USPC ........................................................ 463/37

(58) Field of Classification Search
USPC .......................................................... 463/43
See application file for complete search history.

(56) References Cited

U.S. PATENT DOCUMENTS

| | | | |
|---|---|---|---|
| 4,734,685 A | | 3/1988 | Watanabe |
| 5,327,161 A | | 7/1994 | Logan et al. |
| 5,406,307 A | * | 4/1995 | Hirayama et al. ............ 715/800 |
| 5,409,239 A | * | 4/1995 | Tremmel ......................... 463/37 |
| 5,477,236 A | | 12/1995 | Nanbu |
| 5,488,204 A | * | 1/1996 | Mead et al. ................. 178/18.06 |
| 5,632,679 A | * | 5/1997 | Tremmel ......................... 463/36 |
| 5,757,368 A | | 5/1998 | Gerpheide et al. |
| 6,037,930 A | | 3/2000 | Wolfe et al. |
| 6,053,814 A | * | 4/2000 | Pchenitchnikov et al. ..... 463/36 |
| 6,196,917 B1 | * | 3/2001 | Mathias et al. .................... 463/2 |
| 6,380,931 B1 | * | 4/2002 | Gillespie et al. .............. 345/173 |
| 6,590,567 B1 | * | 7/2003 | Nagao et al. .................. 345/173 |
| 6,935,956 B1 | * | 8/2005 | Ogata et al. ..................... 463/38 |
| 2001/0013855 A1 | * | 8/2001 | Fricker et al. ................. 345/156 |
| 2002/0191029 A1 | | 12/2002 | Gillespie et al. |
| 2003/0134678 A1 | * | 7/2003 | Tanaka ............................ 463/42 |
| 2003/0222856 A1 | | 12/2003 | Fedorak et al. |
| 2004/0107301 A1 | | 6/2004 | Sato et al. |
| 2004/0130525 A1 | | 7/2004 | Suchocki |
| 2004/0196267 A1 | * | 10/2004 | Kawai et al. .................. 345/173 |
| 2005/0009608 A1 | * | 1/2005 | Robarts et al. .................. 463/42 |
| 2005/0012714 A1 | | 1/2005 | Russo et al. |
| 2005/0012717 A1 | * | 1/2005 | Park ............................... 345/163 |
| 2005/0024341 A1 | | 2/2005 | Gillespie et al. |

(Continued)

FOREIGN PATENT DOCUMENTS

| | | |
|---|---|---|
| EP | 0 723 217 A1 | 7/1996 |
| EP | 0 992 878 A2 | 4/2000 |

(Continued)

*Primary Examiner* — Seng H Lim

(74) *Attorney, Agent, or Firm* — Nixon & Vanderhye P.C.

(57) ABSTRACT

Designated coordinates in a coordinate system are set based on coordinate information outputted from a pointing device, and a drag direction from the designated coordinates having been previously set toward the designated coordinates being currently set is set, and an input direction is updated, based on both an input direction being currently stored and the drag direction, to be stored, and a game is controlled based on the input direction being currently stored.

12 Claims, 7 Drawing Sheets

(56) References Cited

U.S. PATENT DOCUMENTS

| | | |
|---|---|---|
| 2005/0041885 A1 | 2/2005 | Russo |
| 2005/0119036 A1* | 6/2005 | Albanna et al. .................. 463/7 |
| 2006/0007182 A1* | 1/2006 | Sato et al. ..................... 345/173 |
| 2006/0073899 A1* | 4/2006 | Kasamatsu et al. ............. 463/43 |
| 2006/0109259 A1* | 5/2006 | Ohta ............................ 345/173 |
| 2006/0277502 A1* | 12/2006 | Aoyama ....................... 715/856 |

FOREIGN PATENT DOCUMENTS

| | | |
|---|---|---|
| JP | 7-182092 | 7/1995 |
| JP | 11-053115 | 2/1999 |
| JP | 2002-939 A | 1/2002 |
| WO | WO 03/065190 A2 | 8/2003 |

* cited by examiner

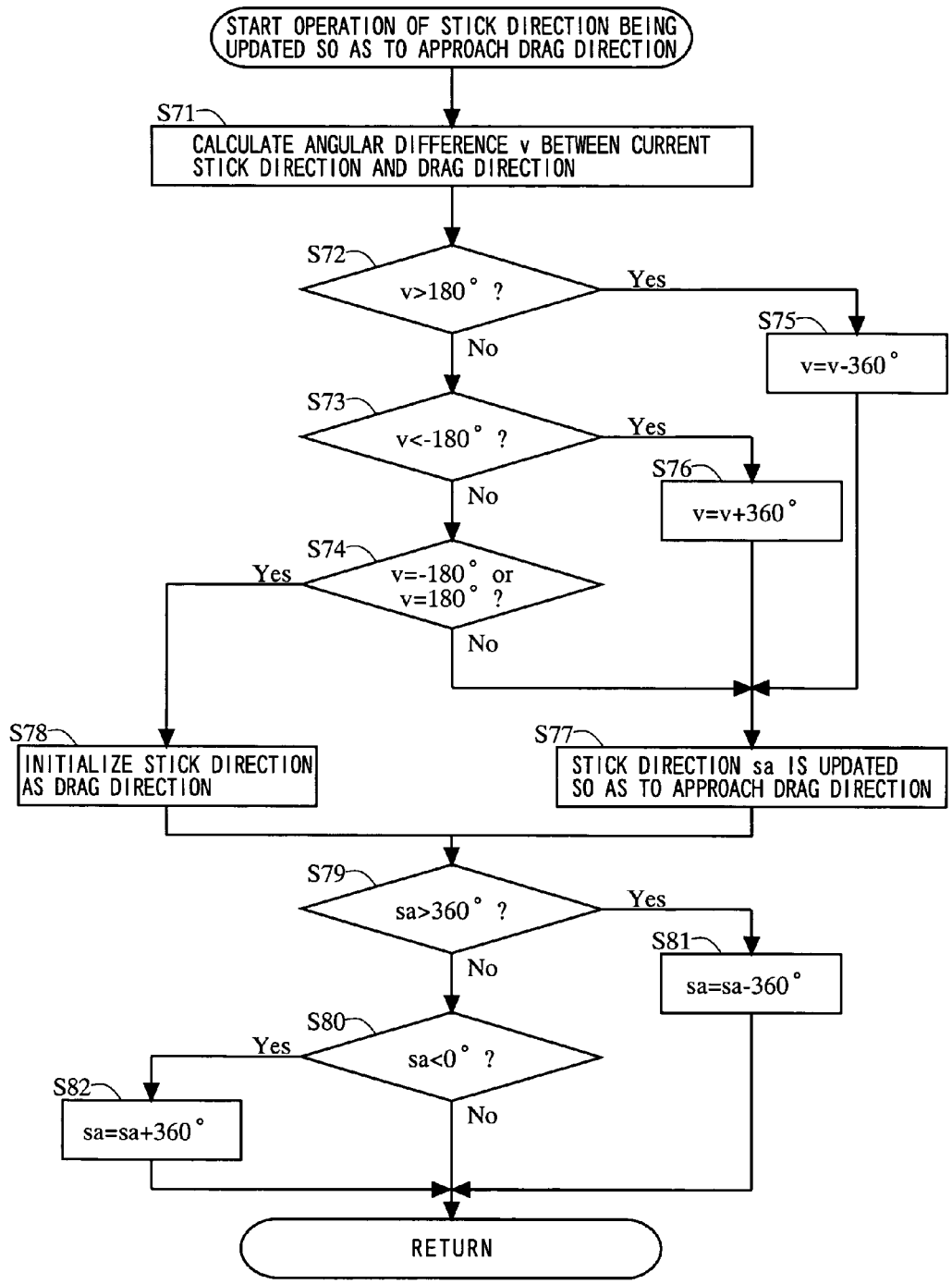

STORAGE MEDIUM HAVING GAME PROGRAM STORED THEREON, GAME APPARATUS, INPUT DEVICE, AND STORAGE MEDIUM HAVING PROGRAM STORED THEREON

BACKGROUND

1. Field of the Technology

The present technology relates to a storage medium having a game program stored thereon, a game apparatus, an input device, and a storage medium having a program stored thereon, and more particularly to a storage medium in which stored is a game program used for a computer game for which a pointing device such as a touch panel is employed, a game apparatus, an input device, and a storage medium having a program stored thereon.

2. Description of the Background Art

Conventionally, various types of games for which a joystick is used as a controller have been developed. The joystick is provided with a lever, and a player tilts the lever forward and backward, and rightward and leftward, thereby making inputs according to the directions. In general, a direction in which the joystick is tilted is handled by a game apparatus as an input direction. In a case where the player tilts the joystick lever in a certain direction to hold the joystick lever at that position, the positional information is continuously outputted and handled by the game apparatus as the input direction. The joystick is also used for a typical personal computer as well as used as a controller for a home game apparatus.

On the other hand, an input device which is operated by a player using a touch panel has been also developed, as disclosed in, for example, Japanese Laid-Open Patent Publication No. 11-53115 (Document 1) and Japanese Laid-Open Patent Publication No. 7-182092 (Document 2). With the input device disclosed in the Document 1, as shown in FIG. 1 and FIG. 3 of the Document 1, a player uses a touch panel to utilize, as a direction in which and a speed at which a cursor moves, a direction and a distance from a predetermined origin on the touch panel to a point at which the player is pointing. On the other hand, in the input device disclosed in the Document 2, as shown in FIG. 6 of the Document 2, a game screen is displayed on a display having a touch panel mounted thereon. According to a movement corresponding to a vector quantity of a movement of a finger with which a player touches the touch panel, an object which is selectively touched is moved on the game screen.

Here, if an operation in which a joystick is emulated can be realized for a game apparatus having a touch panel, it is convenient. In this case, information which is eventually required is a vector value of two axes of X and Y corresponding to a joystick input value. The vector value is represented as a vector value (sx, sy) in a stick coordinate system. A direction indicated by the vector value (sx, sy) is a direction in which the joystick is tilted. Further, the length of the vector value corresponding to the joystick being tilted to the maximum is set as "1". In this case, sx=−1 to +1 and sy=−1 to +1, and the length of "0" indicates that the joystick is in a neutral (upright) position.

Further, the vector value (sx, sy) in the stick coordinate system can be obtained according to the following formula, using an origin (ox, oy) on the touch panel and a point (tx, ty) at which the player is pressing the touch panel, the origin and the point being represented in the touch panel coordinate system.

$$sx=(tx-ox)\times ratio$$

$$sy=(ty-oy)\times ratio$$

where the ratio is a conversion ratio used for defining a length in the touch panel coordinate system, which corresponds to the length "1" in the stick coordinate system. For example, when a length from an origin is "10" in the touch panel coordinate system, the length is defined as "1" in the stick coordinate system. Consequently, the ratio is set as "ratio=1÷10=0.1".

While the device disclosed in the Document 1 utilizes, for information processing, a difference between an origin and a point at which a touch panel is being pressed, when the input method of the invention disclosed in the Document 1 is applied as it is to the operation in which a joystick is emulated, various problems arise. With reference to FIGS. 7A and 7B, the problems on the input device disclosed in the Document 1 will be described. In FIGS. 7A and 7B, the horizontal direction is the X axis direction (the rightward direction is the positive direction) and the vertical direction is the Y axis direction (the forward direction is the positive direction) in the touch panel coordinate system. O is the origin in the touch panel coordinate system. FIGS. 7A and 7B show an example of an operation in which a player uses the touch panel to shift from a stick input vertically in front of the origin (an input for tilting the joystick vertically in front of the origin; an input by which sx=0 and sy>0 is obtained as the stick coordinate values) to a stick input on the right side of the origin (an input for tilting the joystick directly to the right; an input by which sx>0 and sy=0 is obtained as the stick coordinate values). FIGS. 7A and 7B schematically illustrate a mark representing a hand as a player's hand that presses the touch panel.

In FIG. 7A, in a case where the stick input vertically in front of the origin is performed on the touch panel, the player presses a point T1 (t1x, t1y) which is in front of the origin O (ox, oy) (which is in the direction which is parallel to the Y axis and in which the Y value increases) on the touch panel. Based on the origin O (ox, oy) and the point T1 (t1x, t1y), a vector value V1 oriented vertically in front of the origin can be obtained.

On the other hand, in FIG. 7B, in a case where the stick input on the right side of the origin is performed on the touch panel, the player must press a point T2 (t2x, t2y) which is to the right of the origin O (ox, oy) (which is the direction which is parallel to the X axis and in which the X value increases) on the touch panel. Based on the origin O (ox, oy) and the point T2 (t2x, t2y), a vector value V2 oriented to the right can be obtained. Accordingly, when the stick input vertically in front of the origin is shifted to the stick input on the right side of the origin on the touch panel, the player must press the touch panel aiming at the touch point which is in the right backward direction as seen from the point T1, as shown by the dotted lines in FIG. 7B. That is, in the case of the stick input on the right side of the origin being desired, the player attempts to move the pressing point in the rightward direction (the direction which is parallel to the X axis and in which the X value increases) of the point at which the player is currently pointing (it is also convenient for the player to do so), whereas when the point at which the player is currently pointing deviates vertically from the origin, it is not sufficient to move the pressing point in the rightward direction. For example, in a case where the point at which the player is currently pointing is in front of the origin, it is necessary to move the pressing point in the right backward direction in order to make the stick input on the right side of the origin, and thereby the difference between controllability of a joystick and controllability of a touch panel confuses the player operating the touch panel and it is necessary to constantly confirm the position of the origin. Since a frame for guiding a lever is provided for the joystick in practice, for example, in a case where a rightward tilting force is applied to the lever being tilted in the maximum forward direction, the lever is naturally moved in the right backward direction along the guide, and the lever is eventually tilted in the maximum rightward direction. However, in a case where an operation in which a joystick is emulated using a touch panel is realized, since there is no guide as described above, the player must intentionally move the pressing point in the right backward direction. Further, in the case of an actual joystick, since the player can perceive how the lever is being tilted with his finger or hand, it is not necessary to visually confirm the origin of the joystick. However, in a case where an operation in which a joystick is emulated using a touch panel is realized, since it is impossible to perceive the origin with a finger, it is necessary to visually confirm the position of the origin.

A method for relatively moving a cursor according to a movement trace of a player's finger is also disclosed in the Document 1. Further, a method for moving an object which is selectively touched on a game screen according to a movement corresponding to a vector of a movement of a finger with which a player touches a touch panel is disclosed in the Document 2. In these methods, however, since the input is not made until the players' finger moves, the input for which a joystick is emulated cannot be realized. This is because an actual joystick continuously supplies a constant output when a lever is held at a predetermined position. More specifically, in a case where a game object is moved according to a movement corresponding to a vector of a movement of a finger which touches the touch panel, the finger must be continuously moved in order to move the game object.

SUMMARY

Therefore, a feature of an exemplary embodiment is to provide a storage medium having stored thereon a game program for enabling an operation in which a joystick is emulated using a pointing device, preventing a confusion on the operation by matching player's controllability with that for a joystick and also improving response to the operation, a game apparatus, an input device, and a storage medium having a program stored thereon.

The exemplary embodiment has the following features to attain the feature mentioned above. The reference numerals, step Nos. (a step is abbreviated as S and only the step Nos. are indicated), and the like in the parentheses indicate the correspondence with the embodiment described below in order to aid in understanding and are not intended to limit, in any way, the scope of the exemplary embodiment.

A first aspect of an exemplary embodiment presented herein is directed to a storage medium having stored thereon a game program executed by a computer (21) in a game apparatus (1) which is operated using a pointing device (13). The pointing device outputs coordinate information (tx, ty) being based on a given coordinate system (touch panel coordinate system) and being designated according to an operation of a player. The game program causes the computer operable to execute an initial input direction setting step (S42), a designated coordinate setting step (S43 and S44), a drag direction setting step (S46), an input direction update step (S77 and S78) and a game control step (S50). In the initial input direction setting step, an input direction (sa) indicating a direction which is used for controlling a game in the coordinate system is initialized and stored. In the designated coordinate setting step, designated coordinates (touch point (tx, ty)) in the coordinate system is set based on the coordinate information which is outputted from the pointing device. In the drag direction setting step, a direction in the coordinate system from the designated coordinates (previous touch point (ox, oy)) having been previously set toward the designated coordinates being currently set, is set as a drag direction (da). In the input direction update step, the input direction is updated based on both the input direction being currently stored and the drag direction being set in the drag direction setting step to store the updated input direction. In the game control step, the game is controlled based on the input direction being currently stored. The pointing device is an input device for designating an input position or coordinates on the screen, such as a touch panel, a mouse, a track pad, and a track ball. The coordinate system used for each input device is a touch panel coordinate system or a screen coordinate system.

In a second aspect based on the first aspect, in the input direction update step, the input direction is updated such that the input direction being currently stored approaches the drag direction (S77 and S78).

In a third aspect based on the second aspect, the input direction update step comprises a difference calculating step (S71) and an input direction calculating step (S77). In the difference calculating step, an angular difference (v) between the input direction being currently stored and the drag direction is calculated. In the input direction calculating step, the angular difference is multiplied by a predetermined numerical value (p) and the angular difference obtained from the multiplication is added to the input direction being currently stored, thereby to calculate an input direction to be updated and stored.

In a fourth aspect based on the third aspect, the predetermined numerical value for use in the input direction calculating step is a numerical value which is greater than 0 and smaller than 1.

In a fifth aspect based on the first aspect, the computer is further operable to execute an encompassing area setting step. In the encompassing area setting step, an encompassing area (tolerance range) is set around the designated coordinates which are set based on the coordinate information outputted from the pointing device. In the designated coordinate setting step, when a position indicated by the coordinate information which is newly outputted from the pointing device is within the encompassing area, the designated coordinates are not changed, and when a position indicated by the coordinate information which is newly outputted is outside the encompassing area, the designated coordinates are changed based on the position indicated by the coordinate information.

In a sixth aspect based on the first aspect, the computer is further operable to execute an input direction storage step. In the input direction storage step, when an output of the coordinate information from the pointing device is stopped, the input direction which has been set before the output is stopped is stored. In the input direction update step, when the output of the coordinate information from the pointing device is restarted, the input direction having been stored in the input direction storage step is used to update the input direction.

In a seventh aspect based on the first aspect, in the game control step, when the output of the coordinate information from the pointing device is stopped, the game is continually controlled based on the input direction having been set before the output is stopped.

An eighth aspect of an exemplary embodiment presented herein is directed to a game apparatus which is operated using a pointing device. The pointing device outputs coordinate information being based on a given coordinate system and being designated according to an operation of a player. The game apparatus comprises an initial input direction setting means, a designated coordinate setting means, a drag direction setting means, an input direction update means, and a game control means. The initial input direction setting means initializes an input direction indicating a direction which is used for controlling a game in the coordinate system to store the initialized input direction. The designated coordinate setting means sets designated coordinates in the coordinate system based on the coordinate information which is outputted from the pointing device. The drag direction setting means sets, as a drag direction, a direction in the coordinate system from the designated coordinates having been previously set toward the designated coordinates being currently set. The input direction update means updates the input direction based on both the input direction being currently stored and the drag direction being set in the drag direction setting means to store the updated input direction. The game control means controls the game based on the input direction being currently stored.

A ninth aspect of an exemplary embodiment presented herein is directed to an input device for inputting information to the game apparatus. The game apparatus controls a game based on an input direction indicating a direction in a given coordinate system. The input device comprises a coordinate information output means (13), an initial input direction setting means, a designated coordinate setting means, a drag direction setting means, and an input direction update means. The coordinate information output means outputs coordinate information being based on the coordinate system and being designated according to an operation of a player. The initial input direction setting means initializes the input direction to store the initialized input direction. The designated coordinate setting means sets designated coordinates in the coordinate system based on the coordinate information which is outputted from the coordinate information output means. The drag direction setting means sets, as a drag direction, a direction in the coordinate system from the designated coordinates having been previously set toward the designated coordinates being currently set. The input direction update means updates the input direction based on both the input direction being currently stored and the drag direction being set in the drag direction setting means to store the updated input direction.

A tenth aspect of an exemplary embodiment presented herein is directed to a storage medium having stored thereon a program executed by a computer in an information processing apparatus which is operated using a pointing device. The pointing device outputs coordinate information being based on a given coordinate system and being designated according to an operation of a user. The program causes the computer operable to execute an initial input direction setting step, a designated coordinate setting step, a drag direction setting step, an input direction update step, and an operation processing control step. In the initial input direction setting step, an input direction indicating a direction which is used for operation processing in the coordinate system is initialized and stored. In the designated coordinate setting step, designated coordinates in the coordinate system is set based on the coordinate information which is outputted from the pointing device. In the drag direction setting step, a direction in the coordinate system from the designated coordinates having been previously set toward the designated coordinates being currently set is set as a drag direction. In the input direction update step, the input direction is updated based on both the input direction being currently stored and the drag direction being set in the drag direction setting step to store the updated input direction. In the operation processing step, operation processing is performed based on the input direction being currently stored.

According to the first aspect, an input direction used for controlling a game is updated based on a drag direction. That is, an input direction is updated based on a drag direction which is a direction in which a player continuously carries out touch-operation, thereby enabling the input direction to be updated to an input direction which is influenced by the drag direction.

According to the second aspect, the input direction is updated so as to approach the drag direction (a direction in which a player continuously carries out touch-operation), thereby enabling an input which matches with the player's controllability to be realized.

According to the third aspect, an angular difference between the input direction and the drag direction is used to update the input direction to a new input direction, and thereby an operation of the input direction being updated so as to approach the drag direction can be easily realized and the input direction can be appropriately updated according to response or controllability for each game depending on a setting of a predetermined numerical value.

According to the fourth aspect, the predetermined numerical value is set in a range between 0 and 1 exclusive of 0 and 1, and thereby it is possible to adjust a rate at which the input direction securely approaches the drag direction and adjust the input direction as an optimal value according to the response or controllability for each game. Further, the drag direction is not set as the input direction as it is, and thereby a sudden change in input direction can be avoided.

According to the fifth aspect, when coordinate information designated by the pointing device cannot be determined as one point and varies, designated coordinates for use in the processing can be determined differently from the coordinate information and a tolerance can be provided for a position indicated by the coordinate information.

According to the sixth aspect, the input direction is continually maintained, and thereby the player can enjoy the game without the operation being interrupted. Further, even when the operation is interrupted against the player's intention, the player can continue the game feeling as if no interruption has occurred.

According to the seventh aspect, it is unnecessary for the player to continue the same operation for a long time, and thereby the same operation can be easily continued.

Further, the game apparatus, the input device and the program according to the exemplary embodiment enable the same effect as that obtained by the aforementioned game program to be achieved.

These and other features, aspects and advantages of the exemplary embodiment presented herein will become more apparent from the following detailed description of the exemplary embodiment when taken in conjunction with the accompanying drawings.

BRIEF DESCRIPTION OF THE DRAWINGS

FIG. 5 shows a subroutine illustrating, in detail, an operation of a stick direction being updated so as to approach a current vector direction in step 48 shown in FIG. 3;

DESCRIPTION OF THE PREFERRED EMBODIMENTS

Figure 1:
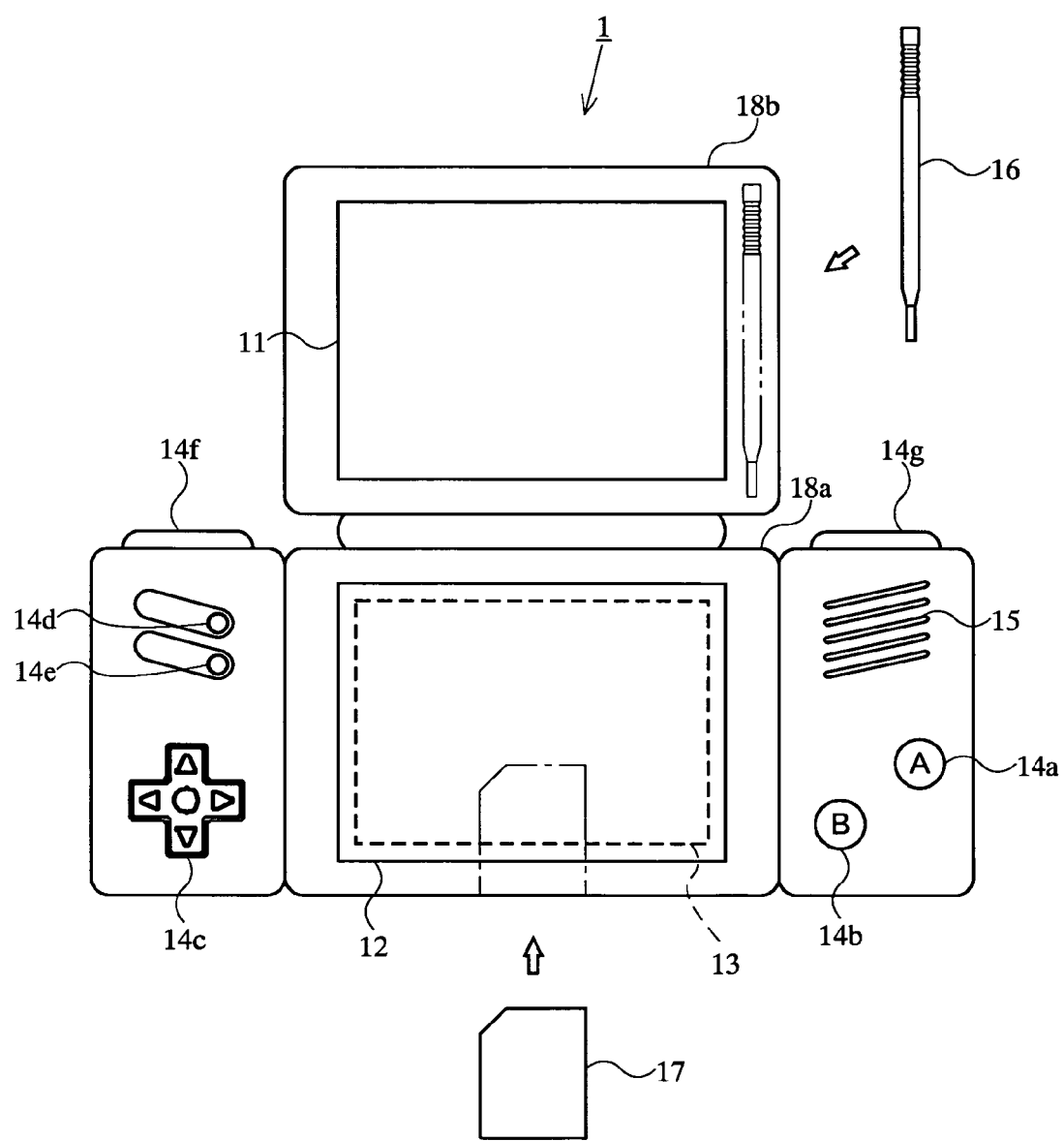
FIG. 1 is an outline view illustrating a game apparatus 1 executing a game program according to one embodiment.

A game apparatus which executes a game program according to one embodiment will be described with reference to the drawings. FIG. 1 is an outline view illustrating a game apparatus 1 which executes a game program according to the present invention. Here, a portable game apparatus is shown as an example of the game apparatus 1.

In FIG. 1, the game apparatus 1 according to this embodiment is accommodated in a housing 18 so that two liquid crystal display devices (hereinafter, referred to as "LCDs") 11 and 12 are placed in predetermined positions. Specifically, in a case where the first LCD 11 and the second LCD 12 are to be positioned one on top of the other, the housing 18 is composed of a lower housing 18a and an upper housing 18b, the upper housing 18b being pivotably supported by a portion of the upper side of the lower housing 18a. The upper housing 18b has a planar contour which is slightly larger than that of the first LCD 11. The upper housing 18b has an opening in one principal face thereof, through which a display screen of the first LCD 11 is exposed. The lower housing 18a has a more elongated planar contour than that of the upper housing 18b (i.e., so as to have a longer lateral dimension). An opening for exposing the display screen of the second LCD 12 is formed in a portion of the lower housing 18a which lies substantially in the center of the lower housing 18a along the lateral direction. A sound hole for the loudspeaker 15 is formed in either (right or left) wings of the lower housing 18a between which the second LCD 12 is interposed. An operation switch section 14 is provided on the right and left wings of the lower housing 18a between which the second LCD 12 is interposed.

The operation switch section 14 includes: an operation switch ("A" button) 14a and an operation switch ("B" button) 14b, which are provided on a principal face of the right wing of the lower housing 18a (lying to the right of the second LCD 12); a direction switch (cross key) 14c, a start switch 14d, and a select switch 14e, which are provided on a principal face of the left wing of the lower housing 18a (lying to the left of the second LCD 12); and side switches 14f and 14g. The operation switches 14a and 14b are used for giving instructions such as: "pass" "shoot", etc., in the case of a sports game such as a soccer game; "jump", "punch", "use a weapon", etc., in the case of an action game; or "get an item", "select a weapon", "select a command", etc., in the case of a role playing game (RPG) or a simulation RPG. The direction switch 14c is used by a player for providing instructions concerning directions on the game screen, e.g., instructions of moving directions of (i.e., a direction in which to move) a player object (or a player character) that can be controlled by using the operation switch section 14, or instructions of a moving direction for a cursor, for example. The side switch ("L" button) 14f and the side switch ("R" button) 14g are provided at the left and right ends of an upper face (upper side face) of the lower housing 18a. As necessary, more operation switches may be added.

Further, a touch panel 13 (an area marked by dotted lines in FIG. 1) is mounted on the upper principal face of the second LCD 12 as an example of the input device of the present invention. The touch panel 13 may be of any one of, for example, a resistive film type, an optical type (infrared type), or a capacitive coupling type. The touch panel 13 is used as an example of a pointing device which, when a stylus 16 (or a finger) is pressed against or moved or dragged on the upper principal face of the touch panel 13, detects the coordinate position of the stylus 16 and outputs coordinate data.

As necessary, a hole (an area marked by double-dot lines in FIG. 1) for accommodating the stylus 16 with which to manipulate the touch panel 13 is provided near a side face of the upper housing 18b. The hole can hold the stylus 16. In a portion of a side face of the lower housing 18a is provided a cartridge receptacle (an area marked by dash-dot lines in FIG. 1), into which a game cartridge 17 (hereinafter simply referred to as "the cartridge 17") internalizing a memory having a game program stored therein (e.g., a ROM) is detachably inserted. The cartridge 17 is an information storage medium for storing a game program, e.g., a non-volatile semiconductor memory such as a ROM or a flash memory. A connector (see FIG. 2) lies inside the cartridge receptacle for providing electrical connection with the cartridge 17. Furthermore, the lower housing 18a (or alternatively the upper housing 18b) accommodates an electronic circuit board on which various electronic components such as a CPU are mounted. Examples of the information storage medium for storing a game program are not limited to the aforementioned non-volatile semiconductor memory, but may also be a CD-ROM, a DVD, or any other optical disk type storage medium.

Figure 2:
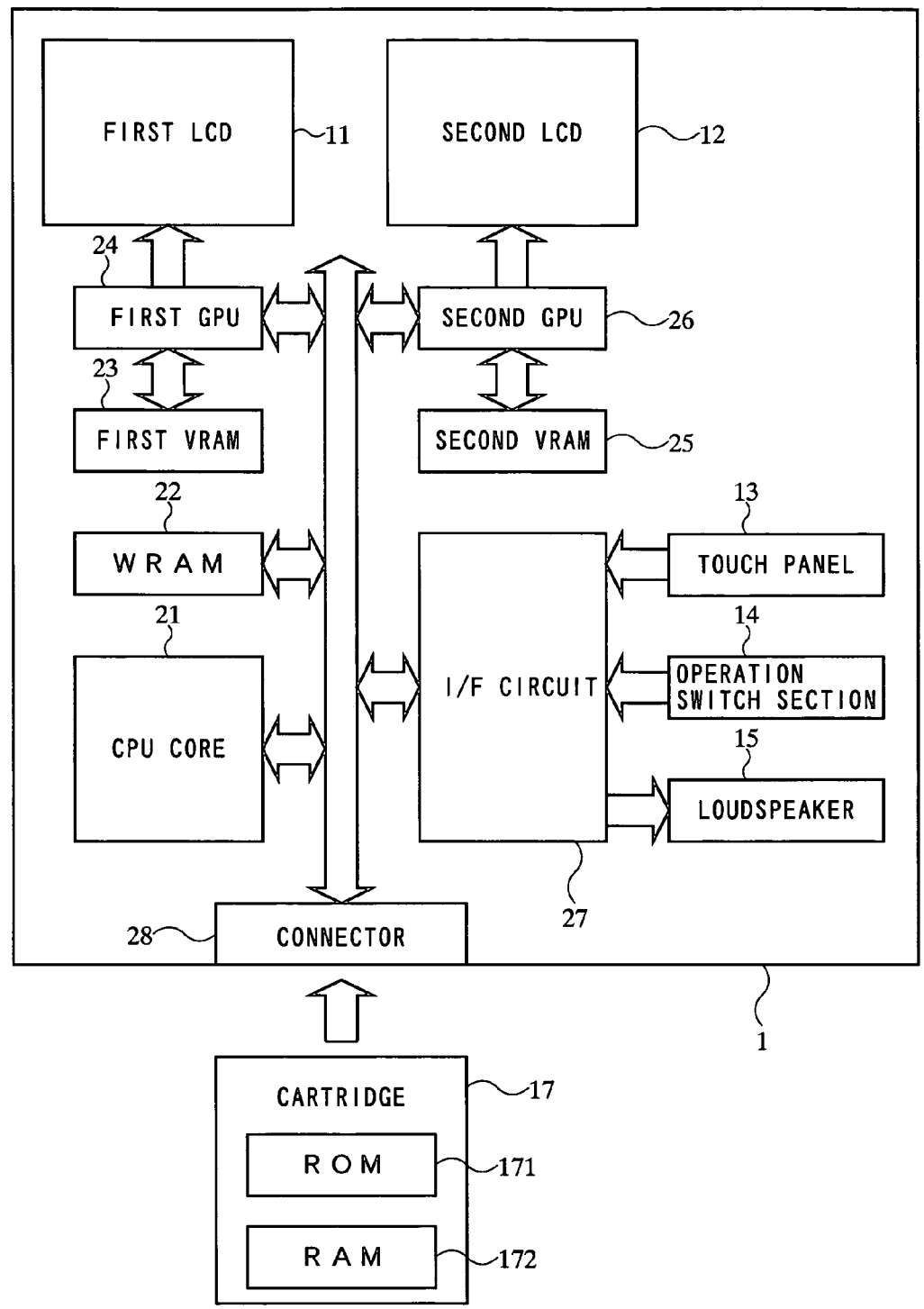
FIG. 2 is a block diagram illustrating an internal structure of the game apparatus 1 shown in FIG. 1.

Next, referring to FIG. 2, the internal structure of the game apparatus 1 will be described. FIG. 2 is a block diagram illustrating an internal structure of the game apparatus 1 of FIG. 1.

In FIG. 2, a CPU core 21 is mounted on the electronic circuit board accommodated in the housing 18. Via a predetermined bus, the CPU core 21 is connected to a connector 28 for enabling connection with the cartridge 17, an input/output interface (I/F) circuit 27, a first graphics processing unit (first GPU) 24, a second graphics processing unit (second GPU) 26, and a working RAM (WRAM) 22.

The cartridge 17 is detachably connected to the connector 28. As described above, the cartridge 17 is a storage medium for storing a game program. Specifically, the cartridge 17 includes a ROM 171 for storing a game program and a RAM 172 for storing backup data in a rewritable manner. A game program which is stored in the ROM 171 of the cartridge 17 is loaded to a WRAM 22, and the game program having been loaded to the WRAM 22 is executed by the CPU core 21. Temporary data which is obtained by the CPU core 21 executing the game program and data from which to generate images are stored in the WRAM 22.

Thus, the ROM 171 has stored thereon a game program which comprises instructions and data which are of a format executable by a computer in the game apparatus 1, in particular by the CPU core 21. The game program is loaded to the WRAM 22 as appropriate, and executed. Although the present embodiment illustrates an example where the game program and the like are stored on the cartridge 17, the game program and the like may be supplied via any other medium or via a communications circuit.

The touch panel 13, the operation switch section 14, and the loudspeaker 15 are connected to the I/F circuit 27. The loudspeaker 15 is placed inside the aforementioned sound hole.

The first GPU 24 is connected to a first video-RAM (hereinafter "VRAM") 23. The second GPU 26 is connected to a second video-RAM (hereinafter "VRAM") 25. In accordance with an instruction from the CPU core 21, the first GPU 24 generates a first game image on the basis of the data used for generation of image which is stored in the WRAM 22, and writes images into the first VRAM 23. In accordance with an instruction from the CPU core 21, the second GPU 26 generates a second game image on the basis of the data used for generation of image which is stored in the WRAM 22, and writes images into the second VRAM 25.

The first GPU 24 is connected to the first LCD 11, and the second GPU 26 is connected to the second LCD 12. The first GPU 24 outputs to the first LCD 11 the first game image which has been written into the first VRAM 23 in accordance with an instruction from the CPU core 21, and the first LCD 11 displays the first game image having been output from the first GPU 24. The second GPU 26 outputs to the second LCD 12 the second game image which has been written into the second VRAM 25 in accordance with an instruction from the CPU core 21, and the second LCD 12 displays the second game image having been output from the second GPU 26.

The I/F circuit 27 is a circuit which governs exchanges of data between the CPU core 21 and the external input/output devices such as the touch panel 13, the operation switch section 14, and the loudspeaker 15. The touch panel 13 (including a device driver for the touch panel) has a touch panel coordinate system corresponding to the coordinate system of the second VRAM 25, and outputs data of position coordinates corresponding to a position which is input (designated) by means of the stylus 16 or the like. For example, the display screen of the second LCD 12 has a resolution of 256 dots×192 dots, and the touch panel 13 also has a detection accuracy of 256 dots×192 dots so as to correspond to the display screen. The detection accuracy of the touch panel 13 may be lower or higher than the resolution of the display screen of the second LCD 12.

Figure 3:
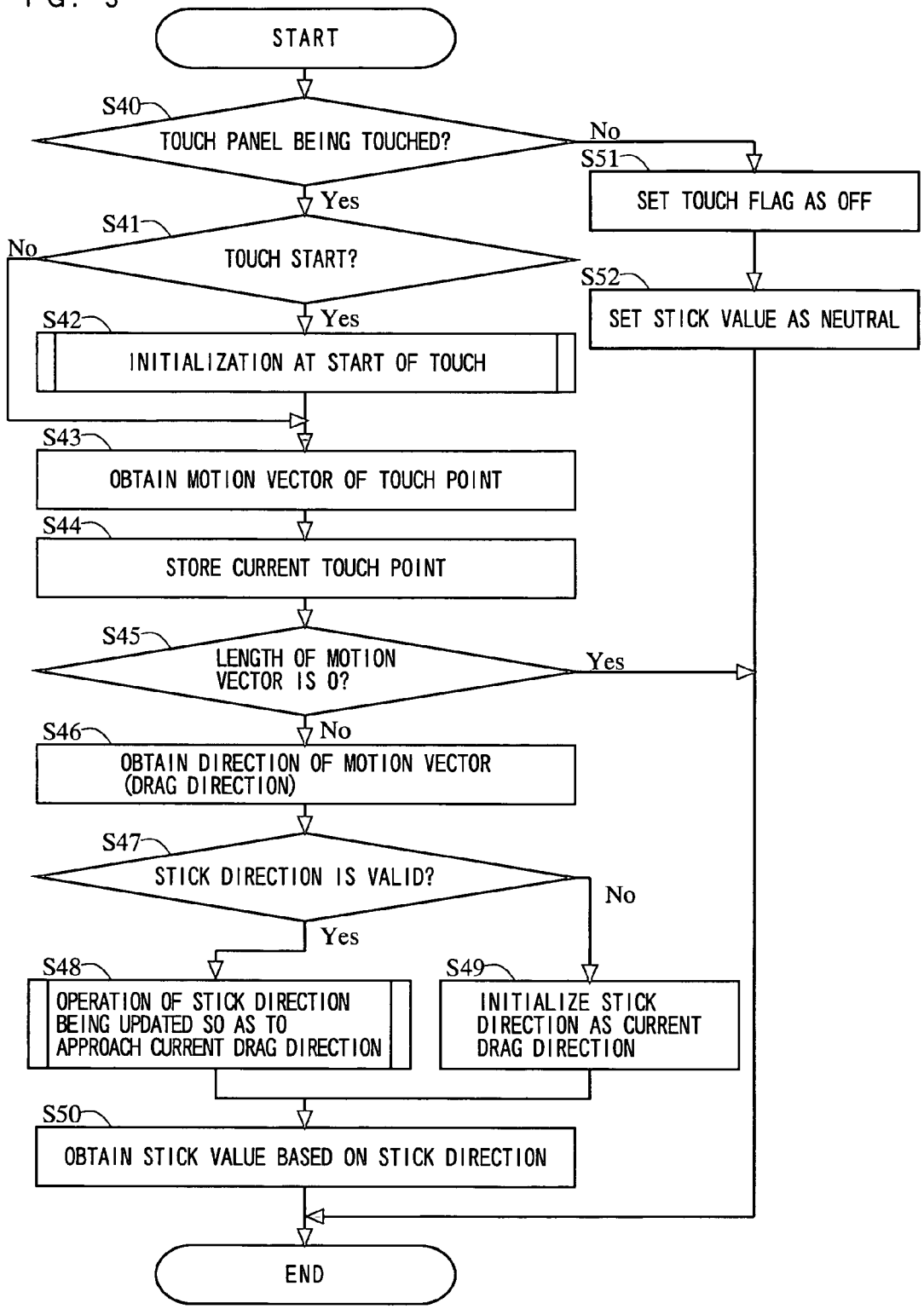
FIG. 3 is a flow chart illustrating an operation performed by the game apparatus 1 by executing the game program according to one embodiment.
Figure 4:
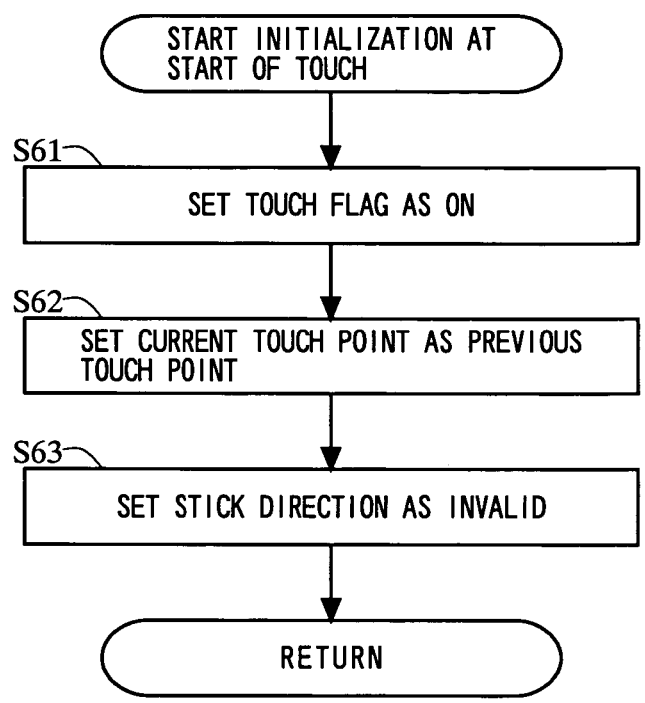
FIG. 4 shows a subroutine which is a detailed operation of initialization at the start of touch in step 42 shown in FIG. 3.
Figure 6A:
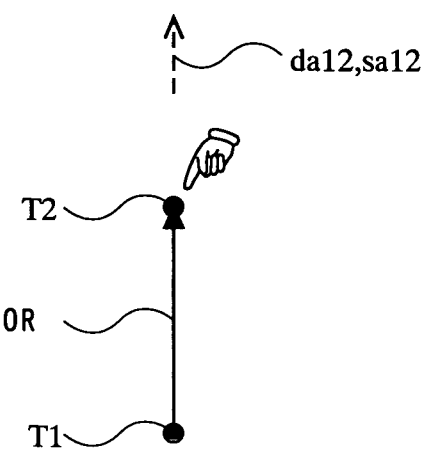
FIGS. 6A and 6B are diagrams illustrating an example where a stick direction is changed by repeating the operation based on the flow chart shown in FIG. 3.
Figure 6B:
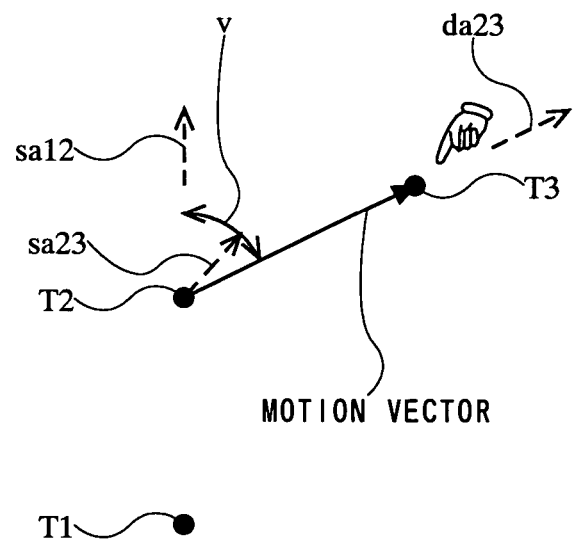
Figure 7A:
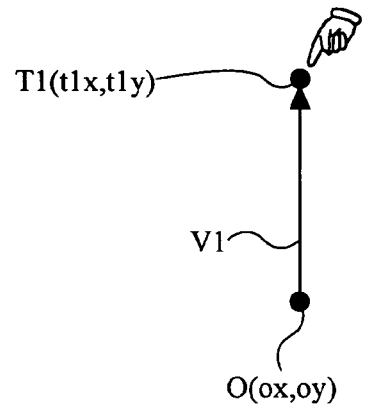
FIGS. 7A and 7B show an example of a prior art operation performed when a player uses a touch panel so as to shift from an input vertically in front of an origin to an input on the right side of the origin.
Figure 7B:
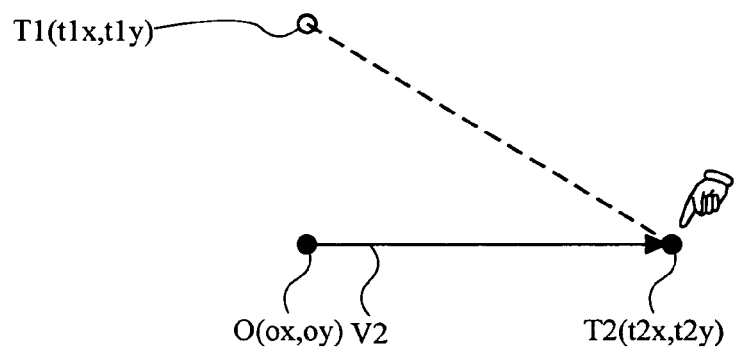

Next, processing which is executed by the game apparatus 1 according to the game program on the basis of information inputted from the touch panel 13 according to the exemplary embodiment presented herein will be described with reference to FIGS. 3 to 6B. FIG. 3 is a flow chart illustrating an operation which is carried out by the game apparatus 1 by executing the game program. FIG. 4 shows a subroutine illustrating an operation of initialization at the start of touch in step 42 of FIG. 3 in detail. FIG. 5 shows a subroutine illustrating an operation of a stick direction being updated so as to approach a current vector direction in step 48 shown in FIG. 3 in detail. FIGS. 6A and 6B are diagrams illustrating an example of a touch operation which is processed through an operation according to the flow chart shown in FIG. 3. The program for executing these processing is contained in the game program stored in the ROM 171. When the game apparatus 1 is powered on, the program is loaded to the WRAM 22 from the ROM 171, and executed by the CPU core 21.

Initially, when the power source (not shown) of the game apparatus 1 is turned on, the CPU core 21 executes a boot program (not shown), and thereby the game program stored in the cartridge 17 is loaded to the WRAM 22. The game program having been loaded is executed by the CPU core 21, thereby to execute steps (abbreviated as "S" in FIGS. 3 to 5) shown in FIG. 3. The game program is executed, and thereby game images and the like in accordance with the game program are written into the first LCD 11 and the second LCD 12. The detailed description is not given of the contents of the game. Here, the processing based on the information inputted from the touch panel 13 will be described in detail.

In FIG. 3, the CPU core 21 determines whether a player is touching the touch panel 13 or not in step 40. The touch panel 13 has a touch panel coordinate system as described above, and outputs data of position coordinates corresponding to a position which is inputted (designated) by means of the stylus 16 or a finger of the player. That is, in step 40, the CPU core 21 detects whether the data of the position coordinates outputted by the touch panel 13 (including a device driver controlling the touch panel 13) is present or not. When the player is not touching the touch panel 13, the CPU core 21 sets a touch flag as OFF in step 51, sets a stick value as neutral (sx=0, sy=0) in step 52, and ends the processing according to the flow chart. On the other hand, when the player is touching the touch panel 13, the CPU core 21 advances the processing to the next step 41.

In step 41, the CPU core 21 determines whether or not the player touch-operates the touch panel 13 as a start of touch (that is, determines whether a non-touch state changes to a touch state or not.) The CPU core 21 can determine whether the touch-operation is a start of touch or not based on whether the touch flag is being set as ON or OFF, which will be described later. When the touch-operation is a start of touch (that is, when the touch flag is being set as OFF), the CPU core 21 advances the processing to the next step 42. On the other hand, when the touch-operation is not a start of touch (that is, when the touch-operation is continued; the touch flag is being set as ON), the CPU core 21 advances the processing to the next step 43.

In step 42, the CPU core 21 carries out initialization at the start of touch. Hereinafter, the initialization at the start of touch will be described with reference to a subroutine shown in FIG. 4.

In FIG. 4, the CPU core 21 sets the touch flag as ON in step 61. The CPU core 21 sets, as a previous touch point on the touch panel 13, a touch point at which the player is currently touch-operating the touch panel 13 (hereinafter, simply referred to as a touch point) in step 62. Specifically, when the current touch point is (tx, ty) and the previous touch point is (ox, oy) in the touch panel coordinate system, the CPU core 21 sets the previous touch point coordinates as $ox=tx$ $oy=ty.$ Next, the CPU core 21 sets a stick direction sa as invalid in step 63, and ends the processing according to the subroutine. Specifically, when the stick direction sa is invalid, the CPU core 21 sets the stick direction sa as $sa=-1.$ Returning to FIG. 3, in step 43, the CPU core 21 obtains a motion vector of the touch point. Specifically, the CPU core 21 obtains a motion vector (vx, vy) based on a difference between the current touch point and the previous touch point. When the current touch point is (tx, ty) and the previous touch point is (ox, oy) in the touch panel coordinate system, the CPU core 21 obtains the motion vector (vx, vy) as $vx=tx-ox$ $vy=ty-oy.$ Next, the CPU core 21 stores, as the previous touch point on the touch panel 13, the current touch point at which the player is currently touch-operating the touch panel 13 in step

44. Specifically, when the current touch point is (tx, ty) and the previous touch point is (ox, oy) in the touch panel coordinate system, the CPU core 21 stores the previous touch point coordinates as $$ox=tx$$

$$oy=ty.$$

Next, the CPU core 21 determines whether a length of the motion vector (vx, vy) is 0 or not in step 45. When the length of the motion vector is 0 (that is, vx=0 and vy=0), the CPU core 21 ends the processing according to the flow chart. On the other hand, when the length of the motion vector is not 0, the CPU core 21 advances the processing to the next step 46.

In step 46, the CPU core 21 obtains a direction of the motion vector (vx, vy) (hereinafter, referred to as a drag direction da). Specifically, the drag direction da is obtained as follows.

$$da=a\tan(vx,vy)$$

where the a tan (x, y) is a function for obtaining an arc tangent of the vector, from which a value of between 0 degrees and 360 degrees exclusive of 360 degrees can be obtained based on the two-dimensional vector value (x, y).

Next, the CPU core 21 determines whether a stick direction sa is valid or not in step 47. When the stick direction sa is valid (sa≠−1), the CPU core 21 advance the processing to the next step 48. On the other hand, when the stick direction sa is invalid (sa=−1), the CPU core 21 advances the processing to the next step 49.

In step 48, the CPU core 21 performs an operation of the stick direction sa being updated so as to approach the current drag direction da, and advances the processing to the next step 50. Hereinafter, the operation of the stick direction sa being updated so as to approach the current drag direction da will be described in detail with reference to FIG. 5.

In FIG. 5, the CPU core 21 calculates an angular difference v between the current stick direction sa and the drag direction da in step 71. Specifically, the CPU core 21 calculates the difference v as follows.

$$v=da-sa$$

Next, the CPU core 21 determines whether v>180° or not in step 72, determines whether v<−180° or not in step 73, and whether v=−180° or not and whether v=180° or not in step 74, so as to represent the difference v in a range of −180°≤v≤180°. In the case of v>180°, the CPU core 21 sets a new difference v as v−360° in step 75, and advances the processing to the next step 77. On the other hand, in the case of v<−180°, the CPU core 21 sets a new difference v as v+360° in step 76, and advances the processing to the next step 77. Further, in the case of v=−180° or v=180°, the CPU core 21 advances the processing to the next step 78, and in the case of −180°<v<180°, the CPU core 21 advances the processing to the next step 77.

In step 77, the CPU core 21 performs an operation of the stick direction sa being updated so as to approach the drag direction da, and advances the processing to the next step 79. Specifically, the CPU core 21 calculates a new stick direction sa as follows.

$$sa=sa+v*p$$

where sa on the left-hand side of the formula represents the new stick direction and sa on the right-hand side of the formula represents a stick direction which was set before the execution of step 77. Further, p is a parameter which is adjusted as 0<p<1 and which indicates a rate at which the stick direction sa approaches the drag direction da. For example, in the case of p=1 (which is not actually set), the new stick direction sa is updated so as to approach the drag direction da such that the new stick direction sa is set to be almost the same as the drag direction da, and in the case of p=0 (which is not actually set), the new stick direction never approaches the drag direction da to set the stick direction as unchanged.

In step 78, the CPU core 21 initializes the stick direction sa as the current drag direction da, and advances the processing to the next step 79. Specifically, the CPU core 21 calculates the new stick direction sa as follows.

$$sa=da$$

where sa on the left-hand side of the formula represents the new stick direction. The processing of step 78 is performed in order to avoid an error in processing, which occurs in the case of the stick direction being exactly opposite to the drag direction (that is, the stick direction sa cannot be updated so as to gradually approach the drag direction da).

Next, in steps 79 to 82, the CPU core 21 determines whether sa>360° or not in step 79, and determines whether sa<0° or not in step 80, so as to represent the new stick direction sa in a range of 0°≤sa≤360°. In the case of sa>360°, the CPU core 21 sets the new stick direction sa as sa−360° in step 81, and ends the processing according to the subroutine. On the other hand, in the case of sa<0°, the CPU core 21 sets the new stick direction sa as sa+360° in step 82, and ends the processing according to the subroutine. In the case of 0°≤sa≤360°, the CPU core 21 ends the processing according to the subroutine.

Returning to FIG. 3, in the step 47, in a case where the stick direction sa is invalid, the CPU core 21 initializes the stick direction sa as the current drag direction da in step 49, and advances the processing to the next step 50. Specifically, the CPU core 21 initializes the stick direction sa so as to be $$sa=da.$$

In step 50, the CPU core 21 obtains a stick value (sx, sy) based on the stick direction sa, and ends the processing according to the flow chart. Specifically, the CPU core 21 obtains the stick value (sx, sy) as follows.

$$sx=\cos(sa)$$

$$sy=\sin(sa)$$

The stick value obtained in step 50 is used for processing a game as for a conventional game for which a joystick is used.

According to the flow chart, an operation in which the touch panel 13 is used to emulate a joystick is realized and the required information is a vector value of 2 axes of X and Y corresponding to an input value of the joystick. The vector value is represented as a stick value (sx, sy) in the stick coordinate system. The direction indicated by the stick value (sx, sy) indicates a direction in which the joystick is tilted. Then, sx=−1 to +1 and sy=−1 to +1. In the case of sx=0 and sy=0, it indicates that the joystick is in a neutral (upright) position.

Hereinafter, an example where the stick direction is changed so as to approach the drag direction will be described with reference to FIGS. 6A and 6B. FIGS. 6A and 6B are diagrams illustrating an example where the stick direction is changed so as to approach the drag direction.

In FIG. 6A, a player touches the touch panel 13 at a touch point T1 for the first time after a non-touch state, and thereafter keeps the touch panel 13 touch-operated to reach a point T2, thereby setting a previous touch point T1 and a current touch point T2. In this case, a motion vector from the previous touch point T1 to the current touch point T2 is set. A direction indicated by the motion vector from the previous touch point T1 to the current touch point T2 is set as a drag direction da12. Here, in a case where a stick direction sa is invalid (No in step 47), the stick direction sa12 is initialized as the drag direction da12. That is, the direction from the initial touch point T1 toward the touch point T2 is set as an initial stick direction.

Thereafter, in FIG. 6B, the player touch-operates the touch panel 13 so as to move from the touch point T2 to a touch point T3 in the right forward direction based on the drag direction da12, thereby setting the previous touch point T2 and the current touch point T3. In this case, a motion vector from the previous touch point T2 to the current touch point T3 is set. A direction indicated by the motion vector from the previous touch point T2 to the current touch point T3 is set as a drag direction da23. By executing the step 48, the stick direction sa12 is updated so as to approach the drag direction da23, thereby setting a new stick direction sa23.

In the operation of the stick direction sa12 being updated so as to approach the drag direction da23, an angular difference v between the stick direction sa12 and the drag direction da23 is initially obtained. The new stick direction sa23 is obtained by adding to the stick direction sa12 a value obtained by multiplying the difference v by a rate being defined according to the parameter p. Therefore, the new stick direction sa23 is set as a direction from the pre-updated stick direction sa12 to the drag direction da23 and the rate at which the pre-updated stick direction approaches the drag direction is adjusted according to the parameter p.

As described above, in the operation of the stick direction being updated so as to approach the drag direction, when a touch point is continuously moved in a certain direction (a direction in which a player moves the touch point; the right forward direction in FIG. 6B), a direction indicated by a stick value (that is, a direction in which a joystick is tilted) is updated so as to gradually approach the direction in which the touch point moves (right forward direction). Thereby, the player continuously moves the designated coordinates in a certain direction, and thereby can determine a stick input direction without concern for a position of an origin. Accordingly, the direction in which the player touch-operates the touch panel is made approximate to the stick direction, thereby enabling the player to operate the touch panel 13 feeling as if he operates a joystick. In addition, an origin on the touch panel, which has been conventionally set, is not set, and the most recent touch point is handled as an origin. Therefore, the player can feel and know the position of the origin which is set on the touch panel 13, and even when the player does not visually check the touch panel 13, the player can operate the touch panel 13 feeling as if he operates a joystick. Moreover, a rate at which a stick direction approaches a drag direction can be adjusted according to a setting value of the parameter p, and thereby the setting value of the parameter p can be adjusted so as to have an optimal value according to response or controllability for each game. Furthermore, the drag direction is not set as the stick direction as it is, thereby enabling a sudden change in input direction to be avoided.

Although in the above-described embodiment a touch point at which a player touch-operates the touch panel 13 is used as it is for calculating a drag direction, a tolerance range provided around the touch point can be used. That is, when a point at which the player touch-operates the touch panel 13 is arbitrarily positioned in the tolerance range, and when the point at which the touch panel is touch-operated deviates beyond the tolerance range, the tolerance range moves according to the movement of the point, resulting in the designated point coordinates at the center thereof being moved. Thereby, hand jiggling correction can be made when the player touch-operates the touch panel 13.

Further, although in the processing of the step 42, a position at which the player initially touch-operates the touch panel 13 is set as a previous touch point, a predetermined position on the touch panel 13 (for example, a center thereof) can be set as an initial position of a previous touch point. In this case, a drag direction can be set as a direction from a touch point at which the player initially touch-operates the touch panel to the initial position of the previous touch point, thereby enabling an operation in which a joystick is emulated to be quickly started.

Further, in the flow chart shown in FIG. 3, when the player stops touch-operating the touch panel 13 (No in step 40), the stick value is set as neutral. However, the stick value which has been set before stopping the touch-operation may be continually handled as a game parameter until the next touch-operation is carried out or until a predetermined time elapses. In a case where the stick value is continually handled as a game parameter until the next touch-operation is carried out, it is not required for the player to continue the same touch-operation for a long time, and thereby the same operation can be easily continued. Further, in a case where the stick value is continually handled as a game parameter until a predetermined time elapses, even when the touch-operation on the touch panel 13 is interrupted against the player's intention (for example, even when the player carelessly moves his fingers off the touch panel), the player can continue the game feeling as if no interruption has occurred.

Moreover, in the flow chart shown in FIG. 3, when a player stops touch-operating the touch panel 13 and then carries out a touch-operation again, a previous touch point is newly set. However, when the next touch-operation is carried out, a stick direction which has been set before stopping the touch-operation can be continually used. For example, the stick direction which has been used in step 50 before stopping the touch-operation, is stored in step 52. When the touch-operation is re-started, the processing of step 48 is carried out using the stick direction. In general, when the player touch-operates an area other than the touch panel 13 during the touch-operation on the touch panel 13, the player touch-operates a different position on the touch panel 13 again and attempts to continue the same operation. Also when the touch-operation is carried out again as described above, since the stick direction is maintained, the player can enjoy the game without the operation being interrupted.

While in this embodiment a touch panel is used as an input device for carrying out an operation in which a joystick is emulated, other pointing devices can be used. Here, the pointing device is an input device which designates an input position or coordinates on a screen. For example, when a mouse, a track pad, a track ball or the like is used as an input device and information concerning a screen coordinate system, which is obtained based on an output value which is outputted from the input device, is used, the present invention can be realized in a similar manner. In a case where a pointing device such as a mouse is used, a touch state and a non-touch state correspond to an ON and an OFF of a click button, respectively, and the game apparatus or the like may calculate coordinates based on an output value which is outputted from the mouse or the like.

In addition, in this embodiment, the touch panel 13 is integrated into the game apparatus 1. Needless to say, however, also when the game apparatus and the touch panel are separately provided, the present invention can be realized. Further, although in this embodiment two display devices are provided, the number of display devices provided can be only one. That is, in this embodiment, it is also possible to provide only the touch panel 13 without the second LCD 12 being provided. In addition, in this embodiment, the second LCD 12 is not provided and the touch panel 13 may be provided on the upper principal face of the first LCD 11.

Moreover, although in this embodiment the touch panel 13 is integrated into the game apparatus 1, the touch panel is used as one of input devices for an information processing apparatus such as a typical personal computer. In this case, a program executed by the computer in the information processing apparatus is not limited to a game program which is typically used for a game, and the program is a general-purpose program in which the stick value obtained in the above-described manner is used for operation processing in the information processing apparatus.

Although in the above-described embodiment only a stick input direction is determined, an input quantity of the stick input (corresponding to a degree to which a lever is tilted) may be determined according to a rate of a drag input (in this case, the input quantity of the stick input may be set as a constant input quantity when no drag input is supplied). Alternatively, the input quantity of the stick input may be determined according to a distance between a reference point and a touch point on the touch panel or the input quantity may be controlled using the button switches (14a and 14b) and the like.

While the exemplary embodiment presented herein has been described in detail, the foregoing description is in all aspects illustrative and not restrictive. It is understood that numerous other modifications and variations can be devised without departing from the scope of the exemplary embodiment.

What is claimed is:

1. A non-transitory storage medium having stored thereon a game program executed by a computer in a game apparatus which is operated using a pointing device for outputting coordinate information being based on a given coordinate system and being designated according to an operation of a player, wherein the game program upon execution of the computer provides execution comprising:
    initializing an input direction vector indicating a direction which is used for controlling a game in the coordinate system of the pointing device to store the initialized input direction vector;
    repeatedly setting designated coordinates in the coordinate system of the pointing device based on the coordinate information which is repeatedly outputted from the pointing device;
    repeatedly setting, as a drag direction vector a direction in the coordinate system of the pointing device from the designated coordinates having been previously set toward the designated coordinates being set at a current time;
    repeatedly updating the input direction vector based on both the input direction vector being currently stored and the drag direction vector being set at the current time in said drag direction vector setting, and storing the updated input direction vector; and
    controlling the game based on the input direction vector being currently stored, wherein
    in said input direction vector updating, the input direction vector is updated such that the input direction vector being currently stored approaches the drag direction vector, being set at the current time, at a predetermined non-instantaneous rate, wherein
    the input direction vector is updated, so that the input direction being currently stored is incrementally changed in a predetermined fashion by amounts proportional to a calculated angular difference between the input direction vector being currently stored and the drag direction vector being set at the current time.

2. The non-transitory storage medium having the game program stored thereon according to claim 1, wherein
    the input direction vector updating comprises:
    calculating an angular difference between the input direction vector being currently stored and the drag direction vector; and
    input direction calculating for multiplying the angular difference by a predetermined numerical value and adding the angular difference obtained from the multiplication to the input direction being currently stored, thereby to calculate an input direction to be updated and stored.

3. The non-transitory storage medium having the game program stored thereon according to claim 1, wherein
    the computer is further operable to execute setting an encompassing area around the designated coordinates which are set based on the coordinate information outputted from the pointing device, wherein
    in said designated coordinate setting, when a position indicated by the coordinate information which is newly outputted from the pointing device is within the encompassing area, the designated coordinates are not changed, and when a position indicated by the coordinate information which is newly outputted is outside the encompassing area, the designated coordinates are changed based on the position indicated by the coordinate information.

4. The non-transitory storage medium having the game program stored thereon according to claim 1, wherein
    the computer is further operable to execute storing, when an output of the coordinate information from the pointing device is stopped, the input direction which has been set before the output is stopped, wherein
    in said input direction updating, when the output of the coordinate information from the pointing device is restarted, the input direction having been stored in the input direction storage step is used to update the input direction.

5. The non-transitory storage medium having the game program stored thereon according to claim 1, wherein
    in said game controlling, when the output of the coordinate information from the pointing device is stopped, the game is continually controlled based on the input direction having been set before the output is stopped.

6. A game apparatus which is operated using a pointing device for outputting coordinate information being based on a given coordinate system and being designated according to an operation of a player, comprising
    an initial input direction vector setting unit for initializing an input direction vector indicating a direction which is used for controlling a game in the coordinate system of the pointing device to store the initialized input direction vector;
    a designated coordinate setting unit for repeatedly setting designated coordinates in the coordinate system of the pointing device based on the coordinate information which is repeatedly outputted from the pointing device;
    a drag direction vector setting unit for repeatedly setting, as a drag direction vector a direction in the coordinate system of the pointing device from the designated coordinates having been previously set toward the designated coordinates being set at a current time;
    an input direction vector update unit for repeatedly updating the input direction vector based on both the input direction vector being currently stored and the drag direction vector being set at the current time in the drag direction vector setting unit, and storing the updated input direction vector; and a game control unit, including a computer processor, for controlling the game based on the input direction vector being currently stored, wherein in said input direction vector updating, the input direction vector is updated such that the input direction vector being currently stored approaches the drag direction vector, being set at the current time, at a predetermined non-instantaneous rate, wherein the input direction vector is updated, so that the input direction being currently stored is incrementally changed in a predetermined fashion by amounts proportional to a calculated angular difference between the input direction vector being currently stored and the drag direction vector being set at the current time.

7. A touch screen input device for inputting information to a game apparatus for controlling a game based on an input direction indicating a direction in a given coordinate system, comprising:

a coordinate information output unit for outputting coordinate information being based on the said given coordinate system and being designated according to an operation of a player, an initial input direction vector setting unit for initializing the input direction vector to store the initialized input direction vector in the said given coordinate system;

a designated coordinate setting unit for repeatedly setting designated coordinates in the said given coordinate system based on the coordinate information which is repeatedly outputted from the coordinate information output unit;

a drag direction vector setting unit for repeatedly setting, as a drag direction vector a direction in the said given coordinate system from the designated coordinates having been previously set toward the designated coordinates being set at a current time; and an input direction vector update unit for repeatedly updating the input direction vector based on both the input direction vector being currently stored and the drag direction vector being set at the current time in the drag direction vector setting unit, and storing the updated input direction vector, wherein in said input direction vector updating, the input direction vector is updated such that the input direction vector being currently stored approaches the drag direction vector, being set at the current time, at a predetermined non-instantaneous rate, wherein the input direction vector is updated, so that the input direction being currently stored is incrementally changed in a predetermined fashion by amounts proportional to a calculated angular difference between the input direction vector being currently stored and the drag direction vector being set at the current time.

8. A non-transitory storage medium having stored thereon a program executed by a computer in an information processing apparatus which is operated using a pointing device for outputting coordinate information being based on a given coordinate system and being designated according to an operation of a user, wherein the program, upon execution by the computer provides execution comprising:

initializing an input direction vector indicating a direction which is used for operation processing in the coordinate system of the pointing device to store the initialized input direction vector;

repeatedly setting designated coordinates in the coordinate system of the pointing device based on the coordinate information which is repeatedly outputted from the pointing device;

repeatedly setting, as a drag direction vector a direction in the coordinate system of the pointing device from the designated coordinates having been previously set toward the designated coordinates being set at a current time;

repeatedly updating the input direction vector based on both the input direction vector being currently stored and the drag direction vector being set at the current time in said drag direction vector setting, and storing the updated input direction vector; and performing operation processing based on the input direction vector being currently stored, wherein in said input direction vector updating, the input direction vector is updated such that the input direction vector being currently stored approaches the drag direction vector, being set at the current time, at a predetermined non-instantaneous rate, wherein the input direction vector is updated, so that the input direction being currently stored is incrementally changed in a predetermined fashion by amounts proportional to a calculated angular difference between the input direction vector being currently stored and the drag direction vector being set at the current time.

9. The non-transitory storage medium having the game program stored thereon according to claim 2, wherein the predetermined numerical value for use in the input direction calculating is a numerical value which is greater than 0 and smaller than 1.

10. The game apparatus according to claim 6, wherein the input direction vector updating comprises:

calculating an angular difference between the input direction vector being currently stored and the drag direction vector; and input direction calculating for multiplying the angular difference by a predetermined numerical value and adding the angular difference obtained from the multiplication to the input direction being currently stored, thereby to calculate an input direction to be updated and stored.

11. The input device according to claim 7, wherein the input direction vector updating comprises:

calculating an angular difference between the input direction vector being currently stored and the drag direction vector; and input direction calculating for multiplying the angular difference by a predetermined numerical value and adding the angular difference obtained from the multiplication to the input direction being currently stored, thereby to calculate an input direction to be updated and stored.

12. The non-transitory storage medium having the program stored thereon according to claim 8, wherein the input direction vector updating comprises:

calculating an angular difference between the input direction vector being currently stored and the drag direction vector; and input direction calculating for multiplying the angular difference by a predetermined numerical value and adding the angular difference obtained from the multiplication to the input direction being currently stored, thereby to calculate an input direction to be updated and stored.

\* \* \* \* \*